(12) United States Patent
Goren et al.

(10) Patent No.: US 8,553,308 B2
(45) Date of Patent: Oct. 8, 2013

(54) METHOD AND DEVICE FOR MONITORING MOVEMENT OF MIRRORS IN A MEMS DEVICE

(75) Inventors: Nir Goren, Moshav Herut (IL); Ido Luft, Ra'anana (IL); Sason Sourani, Hod Hasharon (IL)

(73) Assignee: STMicroelectronics International N.V., Amsterdam (NL)

( * ) Notice: Subject to any disclaimer, the term of this patent is extended or adjusted under 35 U.S.C. 154(b) by 399 days.

(21) Appl. No.: 12/915,295

(22) Filed: Oct. 29, 2010

(65) Prior Publication Data
US 2011/0109951 A1    May 12, 2011

(30) Foreign Application Priority Data
Oct. 29, 2009    (IL) .......................................... 201811

(51) Int. Cl.
*G02B 26/08*    (2006.01)

(52) U.S. Cl.
USPC ....................................... 359/224.1; 359/904

(58) Field of Classification Search
USPC .......... 359/198.1–199.4, 200.6–200.8, 202.1, 359/221.2, 223.1–225.1, 226.2, 904, 290–295, 359/838, 846, 871, 872; 250/204, 559.06, 250/559.29, 230, 234; 347/255–260; 353/39, 353/98–99; 385/15–18, 22; 398/12, 19, 398/45
See application file for complete search history.

(56) References Cited

U.S. PATENT DOCUMENTS

| | | | | |
|---|---|---|---|---|
| 5,061,049 A | * | 10/1991 | Hornbeck | 359/224.1 |
| 5,096,279 A | * | 3/1992 | Hornbeck et al. | 359/230 |
| 5,172,262 A | * | 12/1992 | Hornbeck | 359/223.1 |
| 6,694,072 B1 | * | 2/2004 | Neukermans et al. | 385/18 |
| 2006/0114541 A1 | * | 6/2006 | Van Beek | 359/224 |
| 2008/0001850 A1 | * | 1/2008 | Champion et al. | 345/7 |

* cited by examiner

*Primary Examiner* — Jennifer L. Doak
(74) *Attorney, Agent, or Firm* — Gardere Wynne Sewell LLP (57) ABSTRACT

A method for monitoring movement of at least one moving mirror in a MEMS device comprising one or more moving mirrors, and wherein the monitoring is based upon capacitance changes over time in the MEMS device. The method comprises the steps of: if the at least one moving mirror is an in-plain mirror, then: a. providing DC voltage to the MEMS device in addition to a driving voltage required for the movement of that at least one moving mirror; b. measuring current proportional to capacitance changes associated with the movement of the at least one moving mirror; and c. monitoring the movement of the at least one moving mirror based on the measured current. If the at least one moving mirror is a staggered mirror, then: d. measuring a current associated with the movement of the at least one moving mirror; e. identifying a plurality of ripples associated with capacitance changes in the MEMS device over time, in the measured current; and f. monitoring the movement of the at least one moving mirror based on the identified plurality of ripples.

15 Claims, 8 Drawing Sheets

METHOD AND DEVICE FOR MONITORING MOVEMENT OF MIRRORS IN A MEMS DEVICE

FIELD OF THE INVENTION

The present invention relates to optical systems for scanning or deflecting light beams, and in particularly to MEMS/MOEMS devices which comprise moving reflective elements, such as oscillating mirrors.

BACKGROUND OF THE INVENTION

Certain devices such as wafer defect scanners, laser printers, document scanners, projectors and the like make use of a narrow collimated laser beam that usually scan across a flat surface along a straight line path. A typical optical scanning system for this purpose employs a tilting flat mirror to deflect the beam. The tilting micro-mirror serves as a central element in many Micro Electro Mechanical Systems ("MEMS") devices and/or Micro Opto Electro Mechanical Systems ("MOEMS") devices. For the convenience of the reader, these devices (i.e. MEMS and/or MOEMS) will be referred to hereinafter throughout the specification and claims as "MEMS" devices. Many of these MEMS devices comprise two types of electro-statically mirrors:

In-plane mirrors—this type of mirrors is usually driven at its resonance frequency, the stator and the rotor of these mirrors are at the same layer and the mirrors' driving pulse is usually of a rectangular type signal (these mirrors are also known as resonance mirrors).

Staggered mirrors—this type of mirrors is typically comprised of two different layers, one that comprises the stator while the other comprises the rotor. In some cases, where the stator or the rotor is tilted permanently after manufacturing, only one layer may be used for the stator and the rotor. The staggered mirrors may operate at their resonance frequency or at lower frequencies down to and including DC (these mirrors are also known as linear mirrors).

In most MEMS devices, data that relate to the mirror's position must be very accurate. Unfortunately, the knowledge of the actuation voltage timing is usually insufficient to enable determining the accurate position. Temperature changes, laser power change and other factors contribute to an overall unacceptable error in many cases, e.g. where a MEMS mirror is used for projecting applications that require accuracy of much less than a pixel. Video standards, especially high resolution use hundreds of bits per scan line, hence the significance in the accuracy of the mirror's position.

There are several methods known in the art for monitoring the mirror's position, some of them rely on the electrostatic fingers to derive therefrom an indicator of the mirror position. Each position of the mirror is characterized by having different capacitance induced between the electrostatic fingers, thus, if the capacitance can be measured accurately, it may provide information regarding the mirror's position. The following attempts were made to harness the system capacitance for monitoring the mirror position:

US 2003174376 discloses a control system for controlling the position of the mirrors in a MEMS device. This disclosure uses the absolute capacitance of the mirror to detect the position of the mirror. According to the solution described in this publication, the MEMS mirror device is mounted on a substrate that includes a micro mirror that is movable pivotally about an axis, a first conductive layer on the mirror, a second conductive layer on the substrate, where the first and second conductive layers form a capacitor for determining the position of the mirror. The control according to this disclosure is of the absolute phase by means of measuring the absolute phase of the mirror. Unfortunately measuring this parameter in order to overcome the problem at hand has been found quite unsatisfactory for a number of reasons among which is the parasitic capacitance involved.

US 2008180516 discloses a MEMS mirror device that includes a CMOS substrate, a pair of electrodes, and a reflecting mirror moveable over the substrate and the electrodes. The voltages applied to the electrodes create an electrostatic force causing the edge of the mirror to be attracted to the substrate. According to this publication the position of the mirror can be detected and controlled by sensing a change in capacitance between the mirror edges, by detecting the differential capacitance between the two antipodal electrodes.

The above methods measure the absolute capacitance but still fail to provide reliable and accurate information regarding to the mirror position because of parasitic capacitance that is inherent to the system. In addition due to the nature of the electric circle that drives the mirrors, none of the above methods can measure the capacitance throughout the whole scanning cycle.

SUMMARY OF THE INVENTION

It is object of the present invention to provide a device and method for accurately monitoring the position of mirrors in a MEMS device.

It is another object of the present invention to provide a device and method for measuring the changes in capacitance over time for a MEMS device.

It is yet another object of the present invention to provide a device and method for measuring continuously the changes in capacitance in a MEMS device throughout the whole scanning cycle.

It is still another object of the present invention to provide a method for measuring the maximum deflection angle of in-plain mirrors in MEMS devices.

It is yet another object of the present invention to provide an adequate solution for the 180° ambiguity problem associated with in-plain mirrors of MEMS devices.

It is still another object of the present invention to provide a method for monitoring the movement of at least one moving mirror in a staggered configuration, based on identified plurality of ripples in the mirror resonance frequency.

Other objects of the invention will become apparent as the description of the invention proceeds.

According to a first embodiment of the present invention there is provided a method for monitoring movement of at least one moving mirror in a MEMS device which comprises one or more moving mirrors, wherein the monitoring is based upon capacitance changes in the MEMS device over time, and wherein the method comprises the steps of:

if the at least one moving mirror is an in-plain mirror:
a. providing DC voltage to the MEMS device in addition to a driving voltage required for the movement of the at least one moving mirror;
b. measuring current that is proportional to capacitance changes associated with the movement of the at least one moving mirror; and
c. monitoring the at least one moving mirror movement based on the measured current; and if the at least one moving mirror is a staggered mirror:
a. measuring a current associated with the movement of the at least one moving mirror;

b. identifying a plurality of ripples associated with capacitance changes in the MEMS device over time, in the measured current; and c. monitoring the at least one moving mirror movement based on the identified plurality of ripples.

According to another preferred embodiment of the invention, the driving voltage of the at least one in-plain mirror comprises a series of periodical signals and wherein at least one signal of that series of signals is missed in order to enable establishing a complete cycle of the capacitance change.

According to yet another embodiment of the present invention, in case where the at least one moving mirror is a staggered mirror, the method further comprising the step of:

d. establishing at least one counter signal (i.e. counter acting signal) required to offset at least one of the plurality of identified ripples to prevent unwanted oscillations in the movement of the at least one moving mirror.

The term "establishing at least one counter signal" as used herein should be understood to encompass also application of minimizing algorithms in order to establish the quantities of current/voltage required to offset (eradicate) the measured ripples.

In accordance with another embodiment of the present invention, the method further comprises a step of determining the at least one mirror position based on the at least one mirror monitored movement.

By still another preferred embodiment, the at least one moving mirror is an in-plane mirror, and the method further comprising a step of calculating the maximum deflection angle of the at least one moving mirror.

According to another preferred embodiment, the at least one moving mirror is an in-plane mirror, and the method further comprises a step of determining the direction at which the in-plain mirror rotates.

In accordance with another preferred embodiment, for the at least one moveable mirror that is a staggered mirror, the method further comprises preventing the mirror from rotating at its natural frequency.

According to another aspect of the present invention there is provided a MEMS device comprising at least one moveable mirror and adapted to monitor movement of the at least one moveable mirror based upon capacitance changes in the MEMS device over time, and wherein the MEMS device further comprises:

voltage supply means operative to provide driving voltage required for the movement of the at least one moving mirror;

current measuring means operative to measure current associated with a capacitance change involved with the movement of the at least one moveable mirror;

a processor operative to monitor the movement of the at least one moveable mirror based on the current measurement; and wherein if the at least one moveable mirror is an in-plain mirror, the voltage supply means is operative to provide DC voltage to the MEMS device in addition to the driving voltage, the current measuring means is adapted to measure current proportional to capacitance changes and associated with the DC voltage; and wherein if the at least one moving mirror is a staggered mirror, the MEMS device further comprises means to identify in the measured current a plurality of ripples associated with capacitance changes in the MEMS device over time, and the processor is adapted to monitor the movement of the at least one moveable mirror based on the plurality of identified ripples.

According to another preferred embodiment of this aspect of the invention, in the case that the at least one mirror is an in-plain mirror, the driving voltage provided comprises a series of periodical signals and wherein at least one signal of that series is missed to enable establishing a complete cycle of the capacitance change.

In accordance with another preferred embodiment, processor is further adapted to determine the at least one mirror position based upon the movement of the at least one mirror monitored.

By yet another preferred embodiment, the processor is further operative to establish when the movement direction of the at least one mirror is changed based on the monitored movement of the at least one mirror.

According to still another preferred embodiment, the processor is further operative to calculate maximum deflection angle of the at least one moving mirror being an in-plain mirror.

In accordance with yet another preferred embodiment, wherein the at least one moving mirror is a staggered mirror, the processor is further adapted to prevent that mirror from rotating at its natural frequency. (e.g. referred to hereinbefore as "ripples").

Preferably, for a case where the at least one moving mirror is a staggered mirror, the processor is further adapted to establish at least one counter signal required to offset at least one of the plurality of identified ripples.

BRIEF DESCRIPTION OF THE DRAWINGS

FIG. 3A—demonstrates prior art hardware;

FIG. 3B—demonstrates one possible option for hardware modification which enables the current measurement.

FIG. 4A—demonstrates measurements results when all actuation pulses exist. The repetitive high voltage pulses may blank relatively high percentage of the measurements;

FIG. 4B—demonstrates the measurement's results according to the present invention when occasionally one actuation pulse is omitted to enable a clean full cycle of measurement.

FIG. 7A—presents a side view of a typical prior-art in-plane mirror;

FIG. 7B—demonstrates a solution for the "180° ambiguity" problem;

FIG. 7C—demonstrates another solution for the "180° ambiguity" problem;

FIG. 8A—presents a simulated detector signal according to one embodiment of the invention;

FIG. 8B—illustrates practical results according to the same embodiment of the invention simulated in FIG. 8A;

FIG. 8C—displays the capacitance calculation of the new conductive layer as suggested in FIG. 7B;

DETAILED DESCRIPTION OF PREFERRED EMBODIMENTS

A better understanding of the present invention may be obtained when the following non-limiting detailed examples are considered in conjunction with the accompanying drawings.

In order to better understand the various aspects of the present invention, let us consider the following: Equation (1) is derived simply by using the basic definitions of the parameters used:

$$I(t) = \frac{dQ}{dt} = \frac{d(CV)}{dt} = C\frac{dV}{dt} + V\frac{dC}{dt} \qquad (1)$$

Where:
- I—is the current;
- Q—is the electric charge;
- C—is the capacitance; and
- V—is the voltage.

In the classic case, the capacitance would remain constant over time, therefore the above equation may be reduced to the following:

$$I = C\frac{dV}{dt} \qquad (2)$$

However, according to a preferred embodiment of the present invention, we are interested in the capacitance change when fixed in time voltage is applied to the system. In this case, equation (1) may be reduced to the following:

$$I = \frac{d(CV)}{dt} = V\frac{dC}{dt} \qquad (3)$$

In this case the current will indicate the change in the capacitance with time. Now, let us assume that the capacitance is composed of fixed and variable components:

$$C = C_f + C_v \qquad (4)$$

The parasitic capacitance associated with the fixed capacitance will not be detected when we measure only the change in capacitance, hence:

$$I = V\frac{dC_v}{dt} \qquad (5)$$

As aforesaid, many MEMS devices comprise in-plane mirrors and/or staggered mirrors. The following description relates to these two types of mirrors outlining the difference in implementing the method of the present invention for each type of these mirrors.

In-Plane Mirrors

Figure 1:
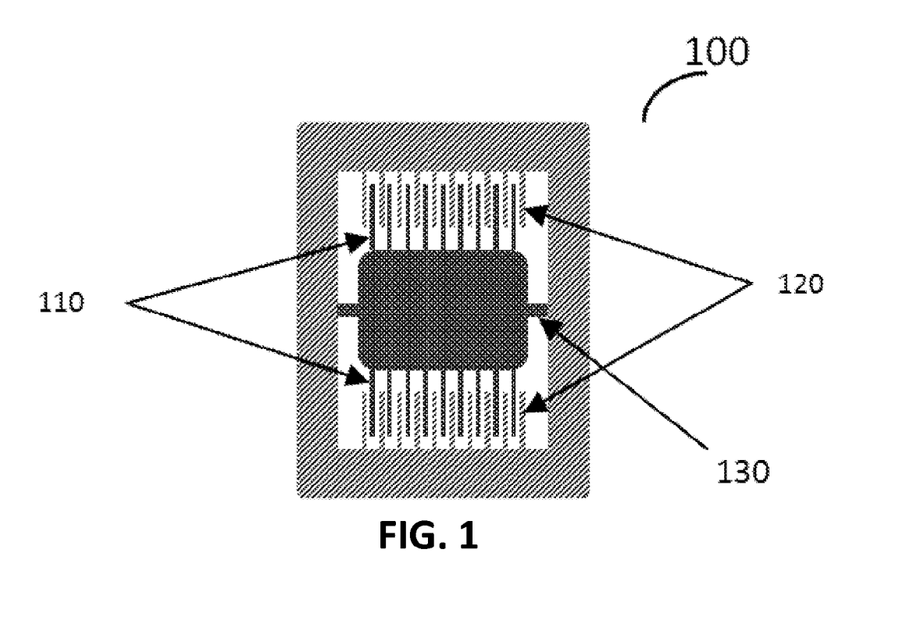
FIG. 1—displays a schematic example of MEMS mirrors apparatus.

FIG. 1 illustrates a schematic example of an in-plain mirror according to the present invention. Device 100 comprises two types of "fingers", the rotor fingers (110) that are connected to the tilting mirror and the stator fingers (120) that are connected to MEMS structure (where both types of fingers reside at the same plane), and a torsional spring (130) that enables the movable MEMS part to move.

Figure 2:
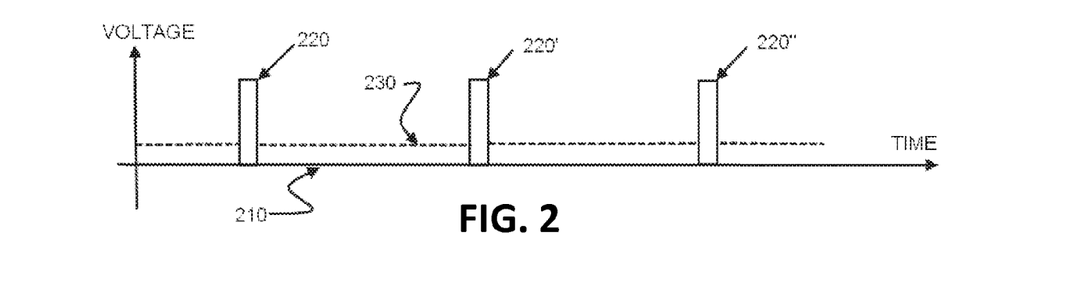
FIG. 2—presents a graph describing the voltage applied to in-plane mirrors dependence in time.

A fixed voltage is applied to the device. FIG. 2 illustrates the voltage profile over time that is applied to the in-plane mirrors. 210 shows the base level of constant voltage applied to a typical prior art device, whereas 220, 220' and 220" are the rectangular signals that form the driving pulse. According to the present invention, a relatively small fixed DC voltage 230 is further applied to the device, in order to enable measuring capacitance changes in accordance with the present invention. The small fixed DC voltage may be either positive or negative, and is selected such that it will preferably have a negligible effect on the mirror operation. Still, it will be such that will enable the measurement of the current evolving due to the change in the capacitance.

Figure 3A:
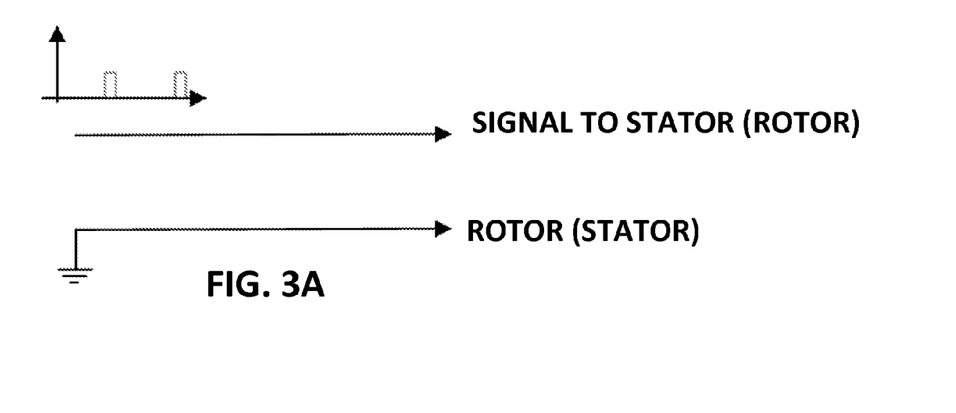
FIGS. 3A and 3b—provide an example of a circuitry that enables measuring the current associated with the capacitance changes.
Figure 3B:
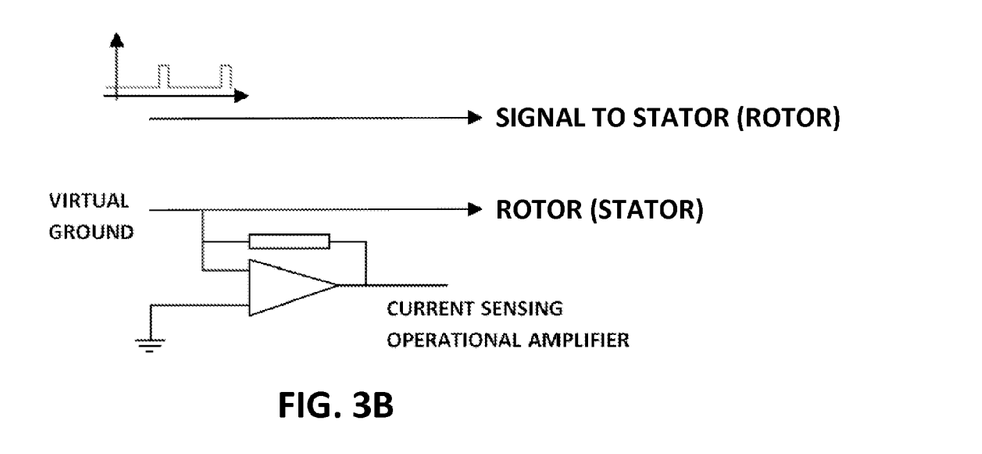

FIGS. 3A and 3B demonstrate examples of a circuitry that enables measuring the current (the "rotor" and the "stator" are interchangeable). FIG. 3A demonstrates the original hardware, and FIG. 3B demonstrates one possible option for hardware modification which enables measuring the capacitance change in time windows were the high driving signal does not exist.

Figure 4A:
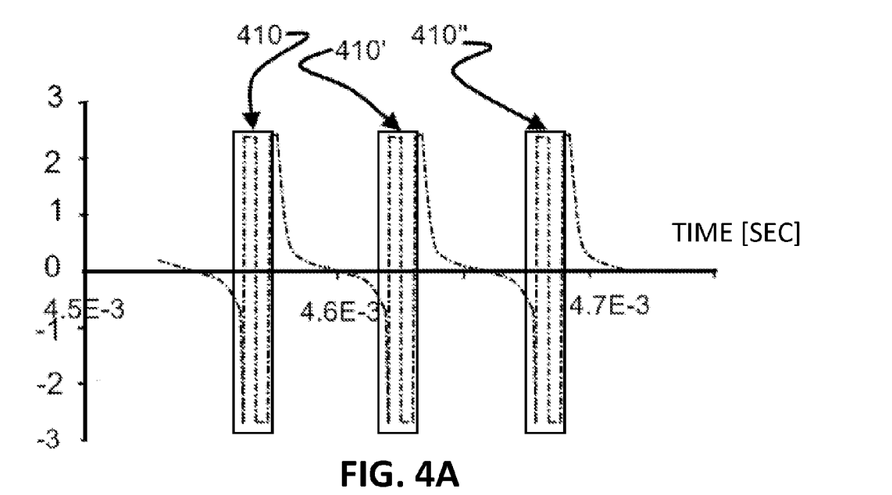
FIGS. 4A and 4B—illustrate an embodiment of the present invention enabling capacitance measurements in a full cycle.
Figure 4B:
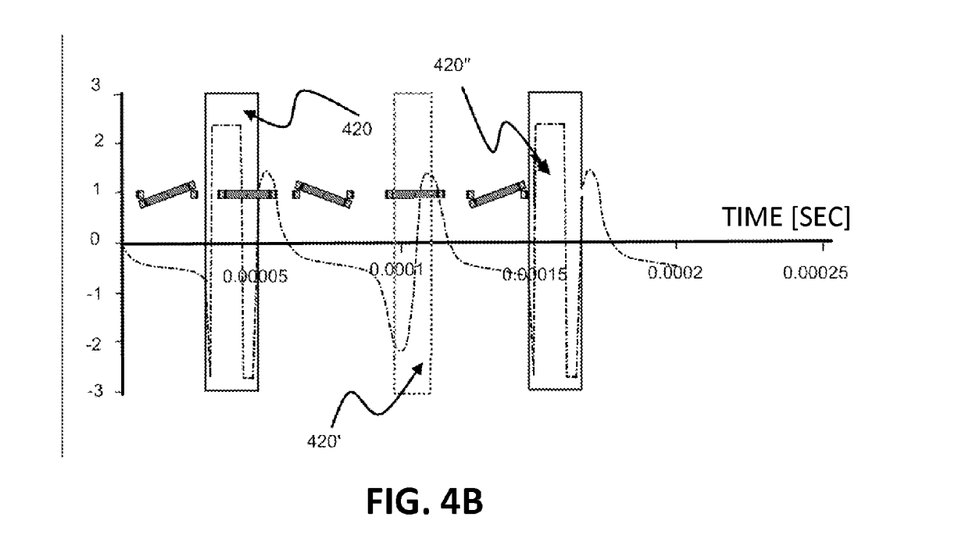

The movement of the in-plain mirror is driven by a driving pulse which is usually a periodically rectangular signal. The high voltage signal drives the operational amplifier to a saturation level and only afterwards the capacitance measurements will take place. Therefore only part of the capacitance change can be measured, this situation is demonstrated in FIG. 4A where 410, 410' and 410" represent blank time segments during which capacitance and particularly capacitance changes, cannot be measured. FIG. 4B demonstrates a solution of the present invention to cover the capacitance changes within a complete cycle. According to one embodiment of the present invention one driving pulse is omitted from time to time, thus enabling to measure the complete capacitance change curve cycle. 420 and 420" represent blank time segments during which the capacitance changes are not measured, while 420' represents a time segment where the pulse is omitted and the capacitance changes are measured. It is particularly convenient to omit a pulse during a period at which the scan accuracy is not critical, for instance during a vertical retrace time of a 2×1D of the scanning mirror, in projecting applications.

Figure 5:
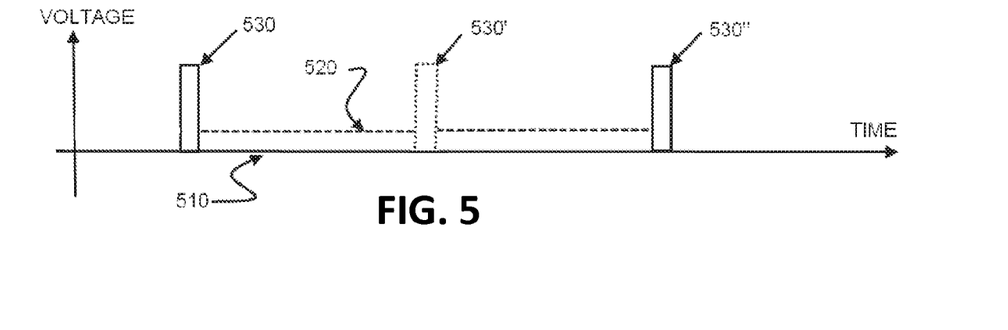
FIG. 5—presents a graph describing the voltage applied to the in-plain mirrors according to the embodiment illustrated in FIG. 4B.

FIG. 5 demonstrates the resulting voltage profile applied to the device. Here again, 510 is the base voltage that is applied to the device whereas 520 is the additional constant voltage applied to the device according to the present invention for the capacitance changes measurements. The driving pulses (rectangle signals) 530 and 530" are examples of driving pulses that are responsible for the mirror movement, but as opposed to the similar profile presented mutatis mutandis in FIG. 2, this time, there is no driving pulse 530' between pulses 530 and 530". Still, in order to achieve a better signal to noise ratio, it is possible to apply during the dilution period a high DC voltage (i.e. the dilution period being a period extending from the pulse that preceded the time at which the missing pulse should have been applied to the pulse that proceeds that time of the missing pulse). If the duration of the applied high DC voltage is essentially equal to one period, its effect would be negligible due to the energy conservation law. However, the current I in Eq. (5) will be much higher since it is proportional to the applied voltage, V.

Figure 6:
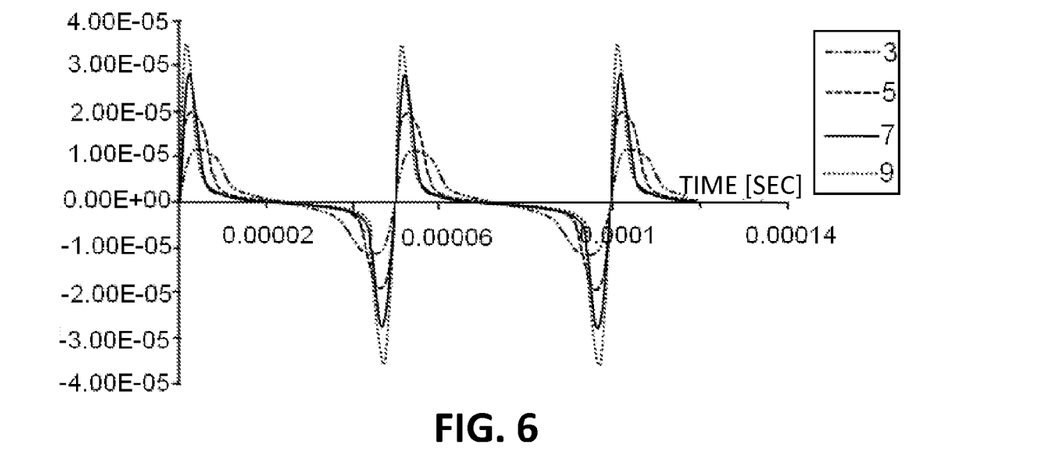
FIG. 6—demonstrates a way to measure the maximum deflection angle of the mirror.

The data describing the capacitance changes may be applied for a variety of uses. For example, to determine if the mirror is actually rotating (this may be important for safety reasons, to avoid eye injuries when the laser beam is reflected from a non-moving mirror), to measure the exact crossover time, i.e. the time when the mirror is parallel to the plane, etc. At that point, the capacitance is at its maximum value and apart from a small timing offset that could be compensated, the capacitance change at this point is equal to zero. According to another embodiment of the invention the capacitance changes enable to determine the maximum deflection angle of the mirror. It is possible to measure it either according to the produced current (the higher $$\frac{dC_v}{dt},$$

the higher is the deflection) as exemplified in FIG. 6 or, according to the distance of the driving pulse and the crossover time.

Figure 7A:
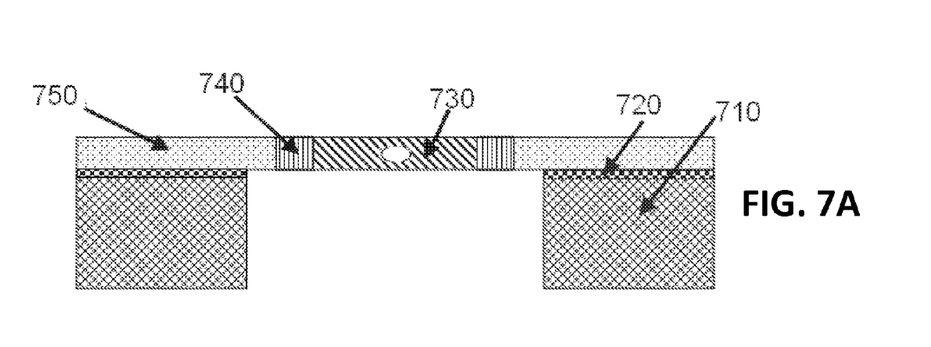
FIGS. 7A, 7B, and 7C—illustrate an embodiment of the present invention for solving the "180° ambiguity" problem in in-plain mirrors.

Due to the full symmetry existing typically in in-plain mirrors, it is usually impossible to determine whether the mirror moves upward or downward. This problem is usually referred to as the "180° ambiguity". At a certain occasion, the mirror may start moving in one direction, while, at another occasion it may start moving in the opposite direction. FIG. 7A is a side view of a typical in-plane mirror, where 710 is the holding frame that constitutes the base for the in-plain mirrors, 720 is an insulation layer, 730 is the rotor, 750 is the stator, and 740 is the overlapping area between the rotor (730) and the stator (750). Several solutions to this "180° ambiguity" problem are known in the art. A typical (but costly) solution is to add an optical detector to solve the ambiguity question. Another solution that could solve the ambiguity is to add a microphone as described in the Applicant's WO 2010/001388. The present invention provides several symmetry breaking options that when applied to a MEMS device, they enable the determination of change in the direction movement of the mirror based on the capacitance change. The following examples provide non limiting forms of solving the 180° ambiguity, but any other solution that is based on measuring the capacitance changes in a MEMS/MOEMS device, should be consider as being encompassed within the scope of the present invention.

Figure 7B:
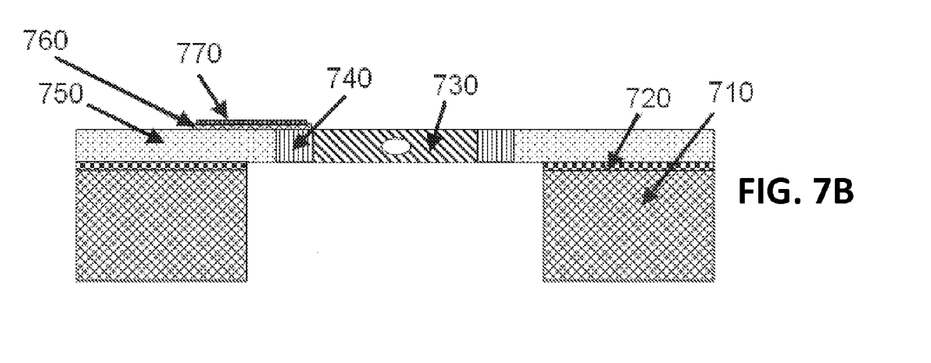
Figure 7C:
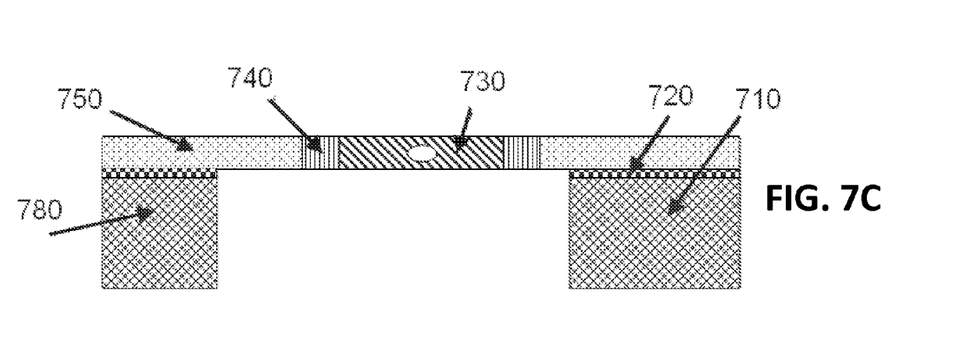

FIG. 7B illustrates breaking the inherent symmetry of the resonator mirror by adding a conductor plating. In this Fig., 760 is insulation plating whereas 770 is conductor plating placed on top of the insulation planting. FIG. 7C demonstrates breaking the inherent symmetry of the resonator mirror by reducing one side of the holding frame, 780 in this Fig. In both cases, using an additional capacitance sensing detector enables the detection of the mirror movement direction. It should be noted that instead of passive capacitance detection, it is possible to introduce active actuation voltage thereby ensuring that the mirror always starts at the correct direction.

Figure 8A:
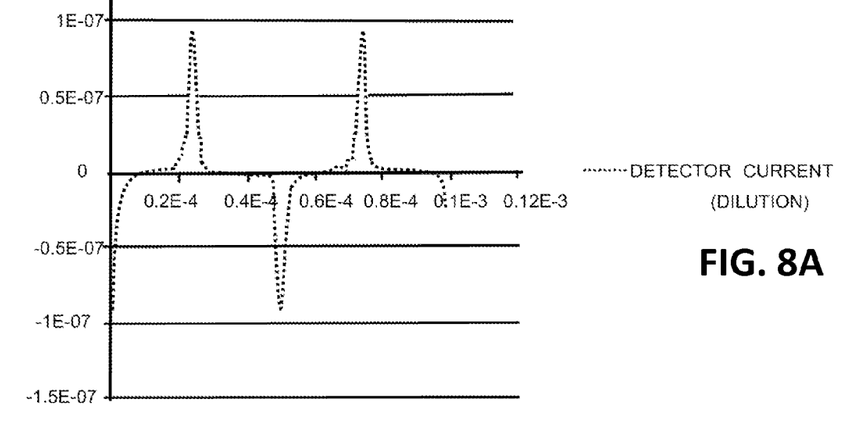
FIGS. 8A, 8B and 8C—provide simulated and practical results associated with some of the embodiments which relate to in-plain mirrors.
Figure 8B:
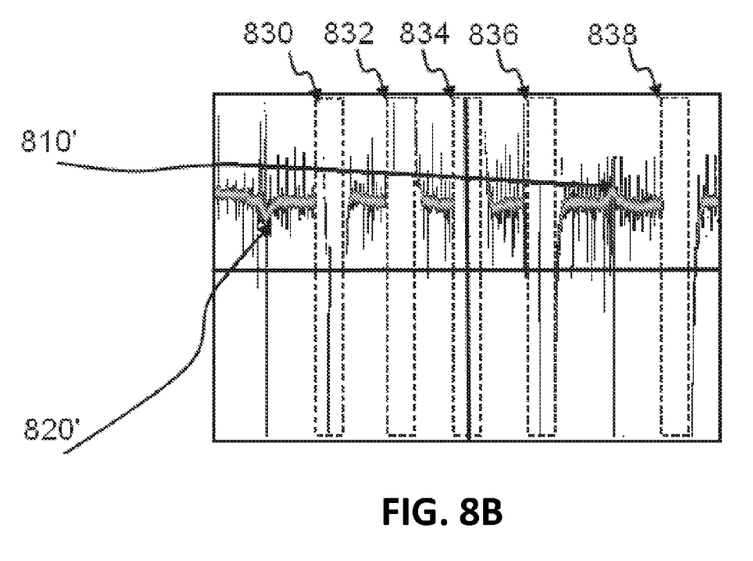
Figure 8C:
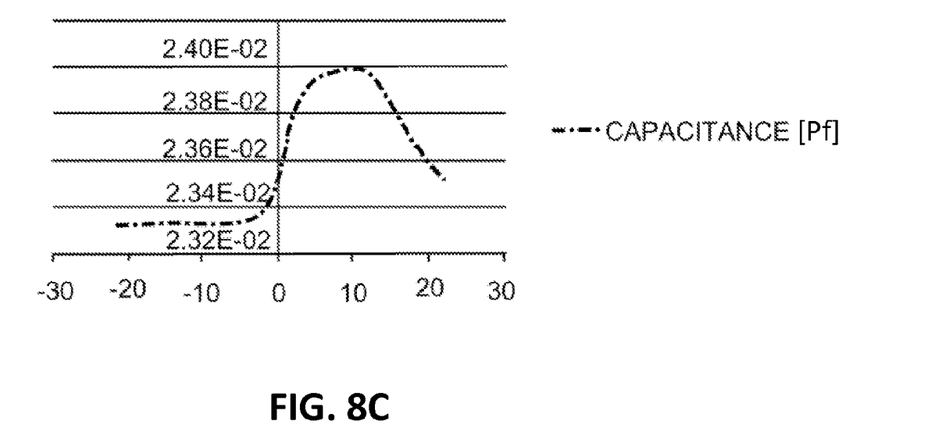

FIGS. 8A, 8B, and 8C provide simulated and practical results associated with some of the embodiments of the present invention that relate to the in-plain mirrors discussed above. FIG. 8A is a simulated detector signal (detector's current). In this simulation one can observe the complete capacitance change curve cycle where 810 and 820 are two reference points that are easily identifiable (further explanation on measuring the complete capacitance change curve cycle were provided hereinabove while discussing FIGS. 4A and 4B). The practical results are illustrated in FIG. 8B where the dilution method was applied in order to receive the full capacitance change curve. Blank time segments 830, 832, 834, 836 and 838 are associated with the voltage pulses where no measurements are made, and 810' and 820' are the points that correspond to the points of FIG. 8A, and were measured when a driving pulse was omitted. FIG. 8C presents the capacitance calculation of the new conductive layer of FIG. 7B using finite elements method (in pF).

Staggered Mirrors

Figure 9A:
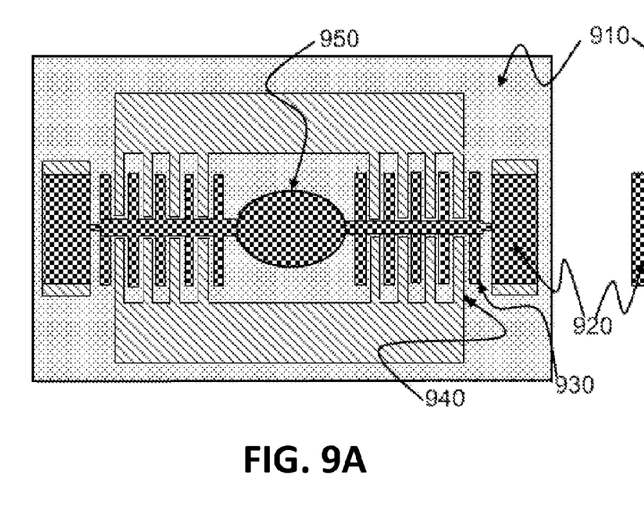
FIGS. 9A and 9B—demonstrate two views of a schematic example of a staggered mirror device.
Figure 9B:
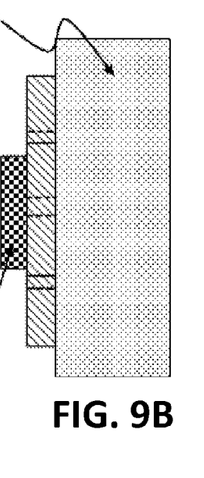

FIG. 9A demonstrates a schematic example of a staggered mirror device according to the present invention. The device comprises two types of "fingers", stator fingers (940) that are connected to MEMS handle (910), and rotor fingers (930) that are connected to the tilting mirror (950) and to ankle (920). FIG. 9B presents the same device in a side view for better demonstrating the fact that the "fingers" are staggered, i.e. are not at the same plain.

Staggered mirrors are used for applications that require non-sinusoidal operation, such as vertical scan in projection systems, where a saw tooth movement is desirable. For this purpose, the driving voltage is usually continuous with the required characteristics that will cause the mirror to move according to a pre-defined path. However a dynamic control is required to prevent the mirror from (slightly) rotating at its natural frequency. As may be recalled from Equation (1), the measured current depends on the voltage change in time and the capacitance change in time:

$$I(t) = \frac{dQ}{dt} = \frac{d(CV)}{dt} = C\frac{dV}{dt} + V\frac{dC}{dt} \qquad (1)$$

But in the staggered mirror case, the driving voltage is typically continuous and cannot be replaced by a constant voltage as in the case of the in-plane mirror. However, the driving voltage is known and theoretically does not include "ripples" in the mirror resonance frequency, therefore, any "ripples" in the mirror resonance frequency may be attributed to capacitance change oscillations, i.e. the ripples in the capacitance measurements are created due to the high Q (low damping factor) of the mirror.

A dynamic control is therefore needed to prevent the mirror from (slightly) rotating at its natural frequency.

As demonstrated hereinbefore, the current that can be measured will be:

$$I = \frac{d(CV)}{dt}$$

But in this case, the applied voltage is continuous and cannot be replaced by a constant voltage as in the case of in-plane resonance mirror. However, the applied voltage is known and typically does not include "ripples" with the mirror resonance frequency. Therefore, any current "ripples" in the mirror resonance frequency is attributed to capacitance change oscillations, that is, to the mirror mechanical oscillations.

Figure 10:
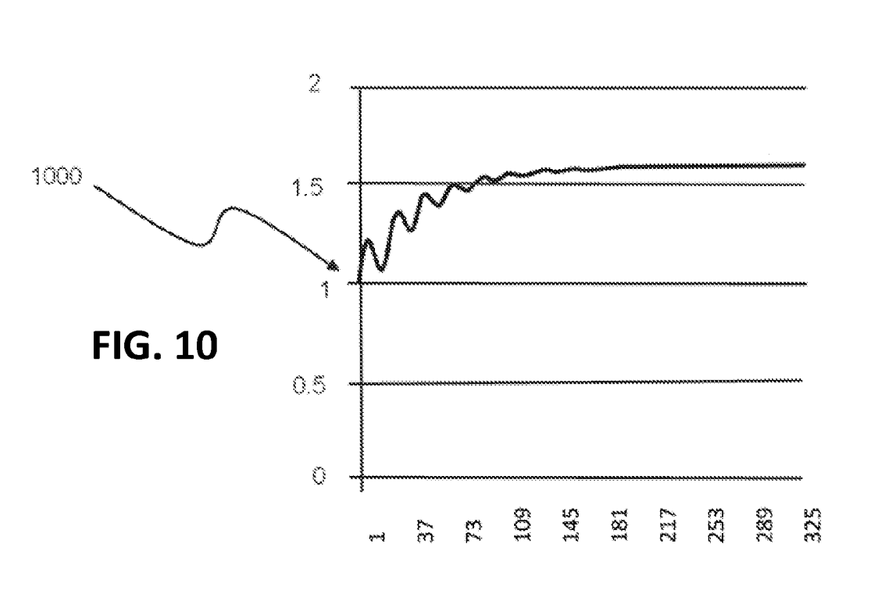
FIG. 10—presents a typical case of staggered mirror having resonance "ripples"

FIG. 10 shows a typical case of staggered mirror having resonance "ripples" as measured by a circuitry similar to the one described in connection with FIG. 3B. The oscillations are clearly measured (1000 indicates the trace start) and it is possible to observe the oscillations decay in time due to mechanical losses. According to a preferred embodiment of the present invention the oscillations are dynamically controlled (i.e. eradicated) by introducing a measurement metrics (such as p-p values or DFT value) and then eradicating the ripples by applying counter signals during the fly-back period. Other cancelling signals and/or minimizing algorithm such as early-late gate algorithm or any other control methods can be applied to achieve full eradication.

Figure 11:
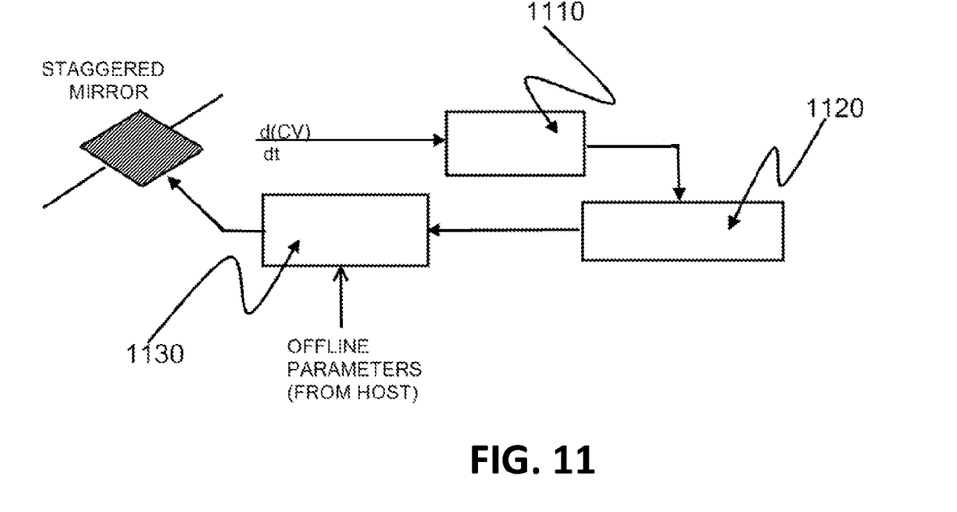
FIG. 11—presents a flow chart demonstrating one option of implementing the method proposed by the present invention.

FIG. 11 provides a flow chart that demonstrates one option for implementing the method proposed by the present invention. The current measurement provides $$\frac{d(CV)}{dt},$$

the measurement metrics are processed using a Discrete Fourier Transform (1110), and an early-late gate algorithm (1120) is used to identify the ripples. Next, counter signals are applied to the driving circular (1130), preferably during the fly-back period to cancel the mirror ripples.

In order to minimize the ripples, a counter-acting signal is introduced. Two measurements are done. The first measurement is done with the current value of the counter-acting signal, while the second measurement is carried out with a slightly modified value. The metrics result of the first measurement is compared with the metrics result of the second measurement. If the second result shows a lower value (less ripples), the second counter-acting signal is considered to be better. The system will then adopt the second signal to be the reference signal and will continue the iterations while using the same trend for modification.

However in case the second measurement yields a higher value result (i.e. more ripples), the selected modification would be considered to worsen the situation, so that the system would stay in this case with the same original state and will apply a reverse modification trend.

It should be mentioned that the algorithm that is used to achieve the required results may be comprised of two or more modification dimensions such as amplitude and phase of the counter-acting signal.

The invention claimed is:

1. A method for monitoring movement of at least one moving in-plane mirror in a MEMS device, comprising:
   a. providing a DC voltage to said MEMS device and in addition applying a periodic pulsed driving voltage required for oscillation movement of said at least one moving mirror;
   b. measuring current that is proportional to capacitance changes associated with the oscillation movement of said at least one moving in-plane mirror over an entire oscillation cycle of the in-plane mirror; and
   c. monitoring said at least one moving in-plane mirror oscillation movement based on the measured current;
   wherein measuring current further comprises omitting application of a pulse in the periodic pulsed driving voltage to said MEMS device and continuing to make the current measurement during a time segment of the omitted pulse.

2. A method according to claim 1, further comprising determining in-plane mirror position based upon said monitored oscillation movement.

3. A method according to claim 1, further comprising calculating a maximum deflection angle of said in-plane.

4. A method according to claim 1, further comprising determining the direction at which said in-plane in plain mirror rotates.

5. A MEMS device comprising:
   at least one moveable in-plane mirror; and
   a circuit adapted to monitor movement of said in-plane mirror based upon capacitance changes in said MEMS device over time,
   said circuit comprising:
      a voltage supply operative to provide to said MEMS device a periodic pulsed driving voltage required for oscillation the movement of said in-plane mirror and a DC voltage;
      a current measuring circuit operative to measure over an entire oscillation cycle of the in-plane mirror a current proportional to a capacitance change involved with the oscillation movement of said in-plane mirror and associated with said DC voltage;
      a processor operative to monitor the movement of said in-plane mirror based on said current measurement; and
      wherein said current measuring circuit is adapted to measure current during a time segment of an omitted pulse in the periodic pulsed driving voltage.

6. A MEMS device according to claim 5, wherein said processor is further adapted to determine said at least one mirror position based upon the monitored movement of said in-plane mirror.

7. A MEMS device according to claim 5, wherein said processor is further operative to establish when the movement direction of said in-plane mirror is changed based upon the monitored movement of said in-plane mirror.

8. A MEMS device according to claim 5, wherein said processor is further operative to calculate maximum deflection angle of said in-plane.

9. A method for monitoring movement of at least one moving staggered mirror in a MEMS device, comprising:
   a. measuring a current associated with a movement of said at least one moving staggered mirror at a deflected position;
   b. identifying from said measured current a decaying resonance ripple associated with capacitance change oscillations in said MEMS device at the deflected position; and
   c. applying a counter-acting signal to said MEMS device during a fly-back period to suppress said decaying resonance ripple at the deflected position.

10. A method according to claim 9, wherein said counter-acting signal offsets unwanted resonance oscillations in the staggered mirror at the deflected position.

11. A method according to claim 9, further comprising determining staggered mirror position based upon said monitored movement.

12. A method according to claim 9, wherein the decaying resonance ripple is associated with a natural resonant frequency of said MEMS device.

13. A MEMS device comprising:
   at least one moveable staggered mirror; and
   a circuit adapted to monitor movement of said at least one moveable mirror based upon capacitance changes in said MEMS device over time,
   said circuit comprising:
      a voltage supply operative to provide a driving voltage to said MEMS device required for movement of staggered mirror to a deflected position;
      a current measuring circuit operative to measure current associated with movement of said staggered mirror at the deflected position;

a processor operative to identify from said measured current a decaying resonance ripple associated with capacitance change oscillations in said MEMS device at the deflected position and apply a counter-acting signal to said MEMS device during a fly-back period to suppress said decaying resonance ripple at the deflected position.

14. A MEMS device according to claim 13, wherein the decaying resonance ripple is associated with a natural resonant frequency of said MEMS device.

15. A MEMS device according to claim 13, wherein the counter acting signal offsets the decaying resonant ripple.

* * * * *

UNITED STATES PATENT AND TRADEMARK OFFICE
CERTIFICATE OF CORRECTION

| | | |
|---|---|---|
| PATENT NO. | : 8,553,308 B2 | Page 1 of 1 |
| APPLICATION NO. | : 12/915295 | |
| DATED | : October 8, 2013 | |
| INVENTOR(S) | : Nir Goren et al. | |

It is certified that error appears in the above-identified patent and that said Letters Patent is hereby corrected as shown below:

In the Claims:

At column 9, claim number 3, line number 67, please replace the phrase [in-plane.] with -- in-plane mirror. --.

At Column 10, claim number 4, line number 2, please delete the phrase "in plain".

At Column 10, claim number 5, line number 12, please delete the word "the" between the words 'oscillation' and 'movement'.

At column 10, claim number 8, line number 34, please replace the phrase [in plane.] with -- in-plane mirror. --.

Signed and Sealed this
Third Day of December, 2013

Margaret A. Focarino
*Commissioner for Patents of the United States Patent and Trademark Office*